United States Patent
Claus

[11] Patent Number: 5,950,665
[45] Date of Patent: Sep. 14, 1999

[54] SLIDE VALVE

[75] Inventor: Thomas Joseph Claus, South Berwick, Me.

[73] Assignee: Robertshaw Controls Company, Richmond, Va.

[21] Appl. No.: 09/118,320

[22] Filed: Jul. 17, 1998

Related U.S. Application Data

[60] Provisional application No. 60/091,380, Jul. 1, 1998.

[51] Int. Cl.⁶ .................................................. F16K 35/00
[52] U.S. Cl. .................................. 137/384.2; 137/625.33; 251/326
[58] Field of Search ............................... 137/625.33, 383, 137/384, 384.2, 556; 251/326

[56] References Cited

U.S. PATENT DOCUMENTS

| | | | |
|---|---|---|---|
| 2,601,304 | 6/1952 | Lane | 251/199 |
| 3,090,218 | 5/1963 | Birkness | 137/383 |
| 3,448,762 | 6/1969 | Schmitt | 137/383 |
| 3,780,982 | 12/1973 | Kemp | 137/625.33 X |
| 5,039,063 | 8/1991 | Louch et al. | 251/326 |
| 5,271,426 | 12/1993 | Clarkson et al. | 137/383 X |
| 5,660,371 | 8/1997 | Davis et al. | 251/329 X |
| 5,669,350 | 9/1997 | Altmann et al. | 251/306 X |

Primary Examiner—Stephen M. Hepperle
Assistant Examiner—John Bastianelli
Attorney, Agent, or Firm—Jules Jay Morris; Sean Detweiler; Terrence Martin

[57] ABSTRACT

The present invention relates to an improved slide valve. A seal support web is positioned in the center of the fluid opening of a movable slide element. The seal support web has a triangular portion that tapers down to a single support beam. The support web is shaped in such as way as to allow for smooth operation of the slide valve at high valve pressures while still maintaining a seal and aiding the seals into a desired position as the valve is closed.

14 Claims, 6 Drawing Sheets

SLIDE VALVE

RELATED APPLICATIONS

This application is related to a co-pending provisional application of the same title, Ser. No. 60/091380 filed Jul. 1, 1998 which is hereby incorporated by reference.

FIELD OF THE INVENTION

The field of the invention relates to Hand Operated Slide Valves for use with fluids.

BACKGROUND OF THE INVENTION

Slide valves are well known in the art for the control of gases and liquids. Some slide valves are hand operated while others are mechanically driven. An example of a conventional slide valve may be found in U.S. Pat. No. 5,039,063 to Louch, et al and assigned to the Marathon Oil Company. Such valves are an inexpensive means of controlling fluid flow. In the slide valve of '063 patent the inventors are concerned with a smooth interior bore that will prevent any turbulence in the flow. This '063 valve was intended for laboratory usage and is unlikely to be used in high pressure applications.

Where slide valves are used commercially they can be used for low and moderate pressure gases and liquids. These types of devices have been limited in their applicability for a number of reasons. An important problem is that these valves become unsuitable or lock up at high pressures so that they can not be operated easily. Further, due to the high pressures, they can suffer from damage to sealing o-rings positioned adjacent to the moveable valve assembly. Because of problems such as these slide valves are generally limited to operating fluid pressure of 250 psig or below.

Another problem is that vibration, operator error or other problems can sometimes result in an inadvertent movement of the valve control.

SUMMARY OF THE INVENTION

The invention comprises an improved slide valve having valve body moveable slide element. A seal support web is positioned in the center of the fluid opening of a movable slide element. The seal support web comprises a triangular shape which is attached with a strut to opposite sides of the fluid opening. The fluid opening is generally circular. The seal support web acts as a support for the o-rings that form a fluid seal between the moveable slide element and the valve body.

The slide element with the o-ring support web is configured to provide maximum support to the o-rings while the valve is being either opened or closed. When fluid flow is present and the slide element in mid-position, maximum stress is applied on the seals of the device. The support web is shaped in such a way as to allow for smooth operation of the slide valve at high valve pressures while still maintaining a seal. Further, the web support in no way interferes with use of the slide device as a low-pressure device while still providing excellent sealing properties.

The improved slide element also incorporates circular and rectangular lockout features that allow use of a padlock or scissors lock to prevent inadvertent opening of the valve.

DRAWINGS

The following figures in which reference numerals identify like elements, are not necessarily to scale, but are merely intended to illustrate the principals of the invention. The figures are not-intended to be limiting, but merely to help in identifying the unique features of the improved slide valve.

DETAILED DESCRIPTION OF THE INVENTION

Figure 1:
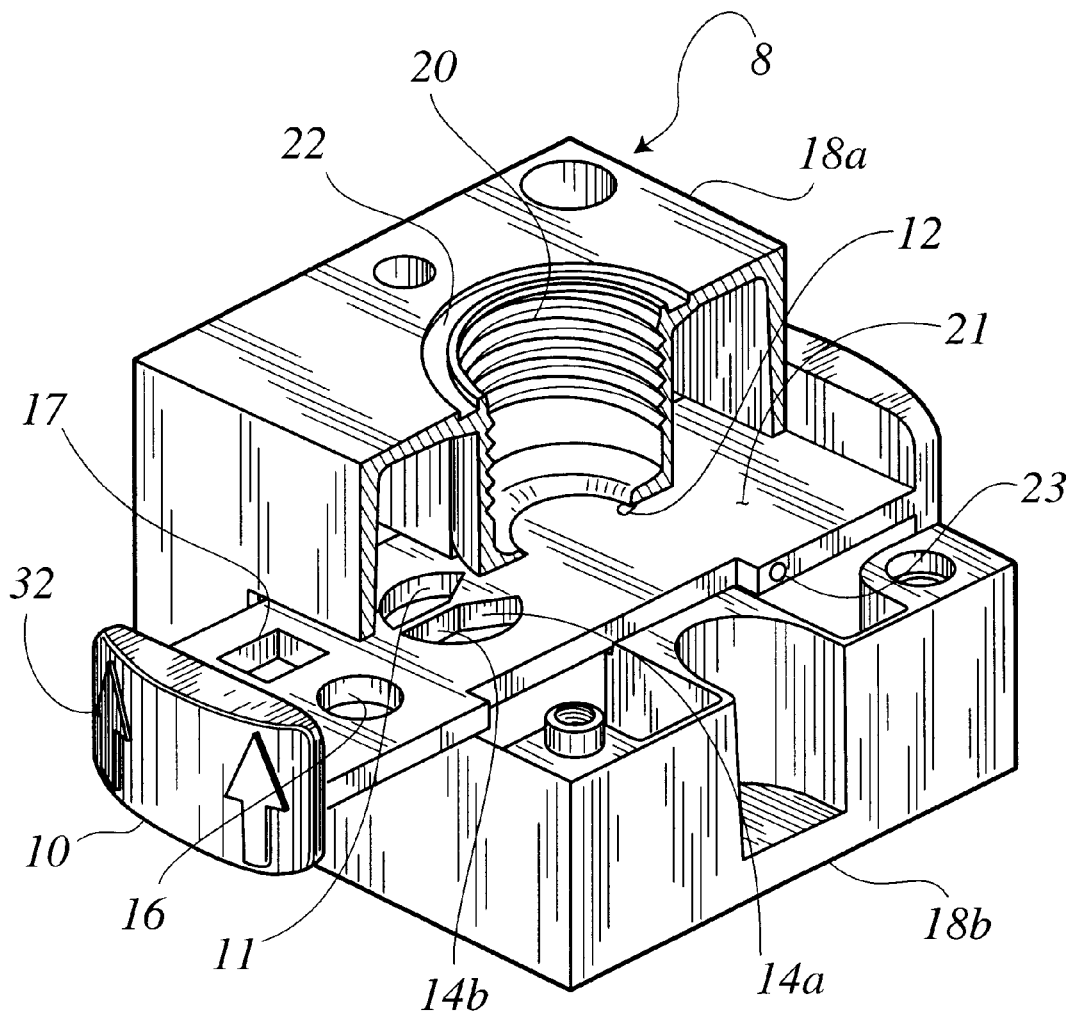
FIG. 1 is a partial cross-section of the slide valve identifying the valve body, seals and slide elements.

The slide valve of this invention represents a control valve that provides an improved performance, extended applicability and improved ease of use. FIG. 1 is partial cross-sectional view of slide valve 8 having a moveable slide section 10 which is used for opening and closing the valve for fluid passage through a fluid port 20. The valve is arranged so the slide 10 can be moved between positions and allow fluid passage from port 20 through slide valve port 11 when the valve is opened otherwise a blank surface on the slide 10 prevents fluid flow through the valve.

The slide valve 8 comprises two valve bodies, preferably metallic, sections 18a and 18b that are identical. Port 20 therefore exists on both body sections 18. The valve would normally be positioned in a fluid pipe or other flow directing passage to selectively control the fluid flow through the pipe. Seal ring seat 22 is intended for an o-ring (not shown) that provides sealing between the valve body and the fluid passage to which the valve is mounted. When the slide valve is connected to flow pipes, the pipes can be directly threaded into port 20 and no o-ring is required. The seal rings in seats 22 are required on either sections of the valve body 18 when connecting the slide valve to a modular element such as a filter, regulator or another slide valve. Once the valve body is mounted in the flow passage the slide valve 10 is ready for use to control fluid flow between sections of a fluid passage.

The slide valve 8 incorporates several novel features. These are most related to the seals that are provided between the valve body 18 and a moveable slide 10. Sealing is provided by o-rings 12 positioned in depressed annular seats in the valve bodies 18 on both sides of the slide. Circular o-rings provide complete sealing between the valve body and the slide to prevent leakage of fluid through the side openings at the interior edges of the two seal body portions 18. The slide is preferably of plastic material that aids in creating a fluid seal with the o-rings.

As shown in FIG. 1, when the slide is positioned partially open to allow fluid passage through the valve port 20, the o-rings remain partially supported by support web 10 formed in slide valve port 11. The triangular portion 14a of the web support is broadest at its base and narrows toward the center of valve port 11. This is important for maintaining or urging the seals back into position when the valve is opened or closed. The shape of the web serves to gently push the sealing o-rings back into position if they are displaced or extruded by pressure stresses when the valve slide is between the fully opened or closed positions. Particularly, the triangular web section 14a helps guide the o-rings back into their seats when the valve is closed. Stress on the sealing surface and o-rings is reduced when the port is completely opened so that valve port 11 is fully aligned with flow port 20.

The web support 14a tapers down to single support beam 14b which allows full flow while continuing to support the o-rings and providing a strong structural element for the support web inside valve port 11 when the valve is opened. Use of the support web 14 provides for smooth valve opening and closing even at higher pressures than previously possible with this type of valve. Fluid pressures in excess of 300 psi can now be applied to this slide valve without any substantial leakage or the previously common problem of the slide becoming difficult to move due to seal extrusion or displacement caused by the pressure on the seals when the valve is operated.

Figure 2:
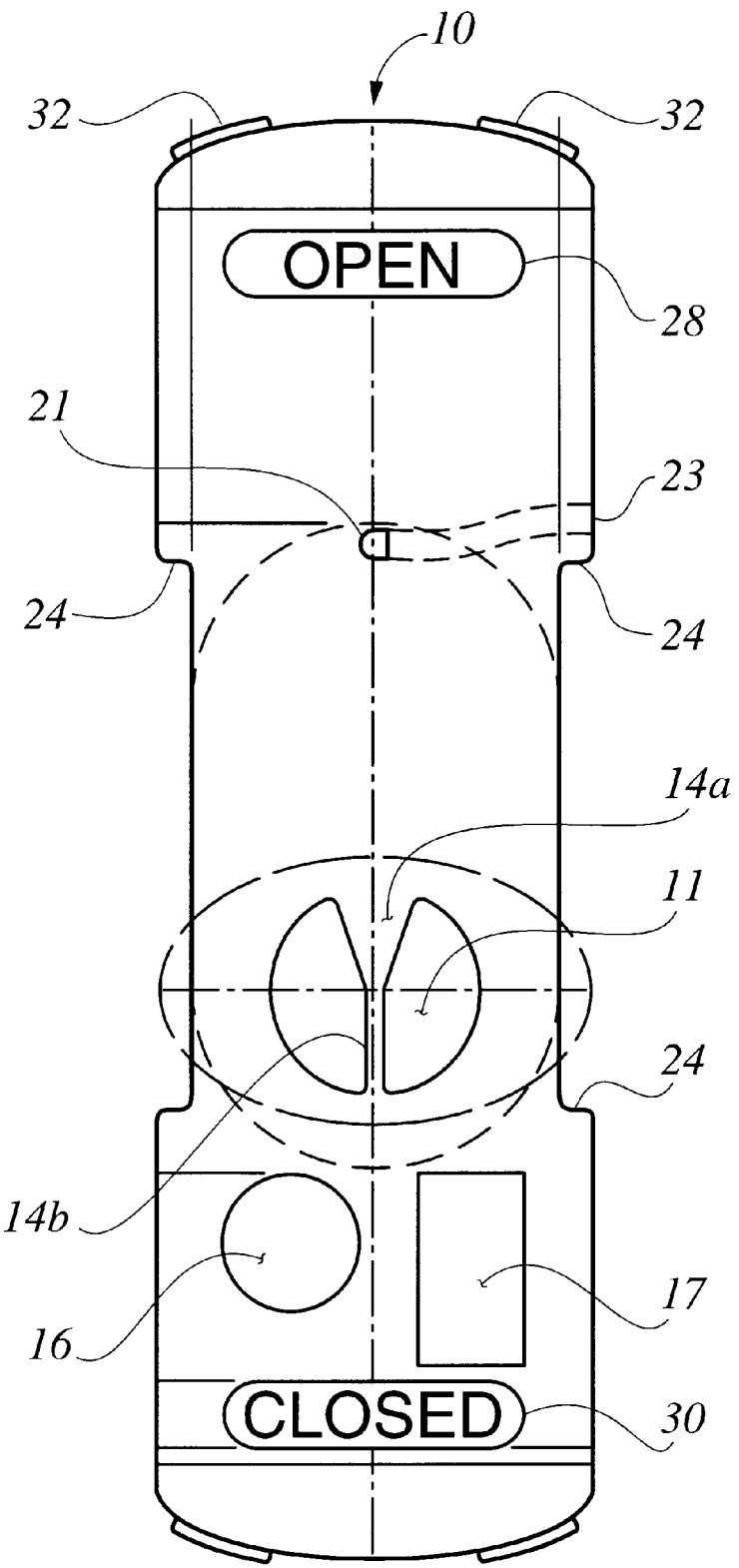
FIG. 2 is a top plan view of the moveable slide element showing details of the support web.

FIG. 2 provides a top plan view of the slide valve closely detailing the bifurcated slide valve port which can be moved between positions allowing or preventing fluid flow through the valve. The slide is preferably made of a rugged plastic material with excellent strength and sealing capabilities. Shoulders 24 restrict movement of the slide by engaging flanges 26 (FIG. 3) so that the slide is stopped and cannot be pushed beyond normally opened and closed positions. Lock passages 16 and 19 provide a means for the use of a padlock or scissors lock to maintain the valve in the close position so it will not inadvertently be opened. Operator indicia 28 and 30 identify whether the valve is opened or closed.

Raised sections 32 comprise indicator arrows (FIG. 1) on the slide ends that identify the preferred direction of fluid flow. Indicator arrows point towards the downstream side of the fluid flow. This is particularly important when valves are equipped with an optional downstream pressure relief feature. This feature can be most readily seen in FIG. 1. Port 21 is positioned on the downstream side of the slide valve and is fluidly connected to port 23 on the side of the valve. Port 21 bridges the seal ring 12 on the downstream side of the valve so that any captured fluid pressure from flowpaths on the downstream side of the valve is vented out of the valve when the valve is in the fully closed position.

Figure 3:
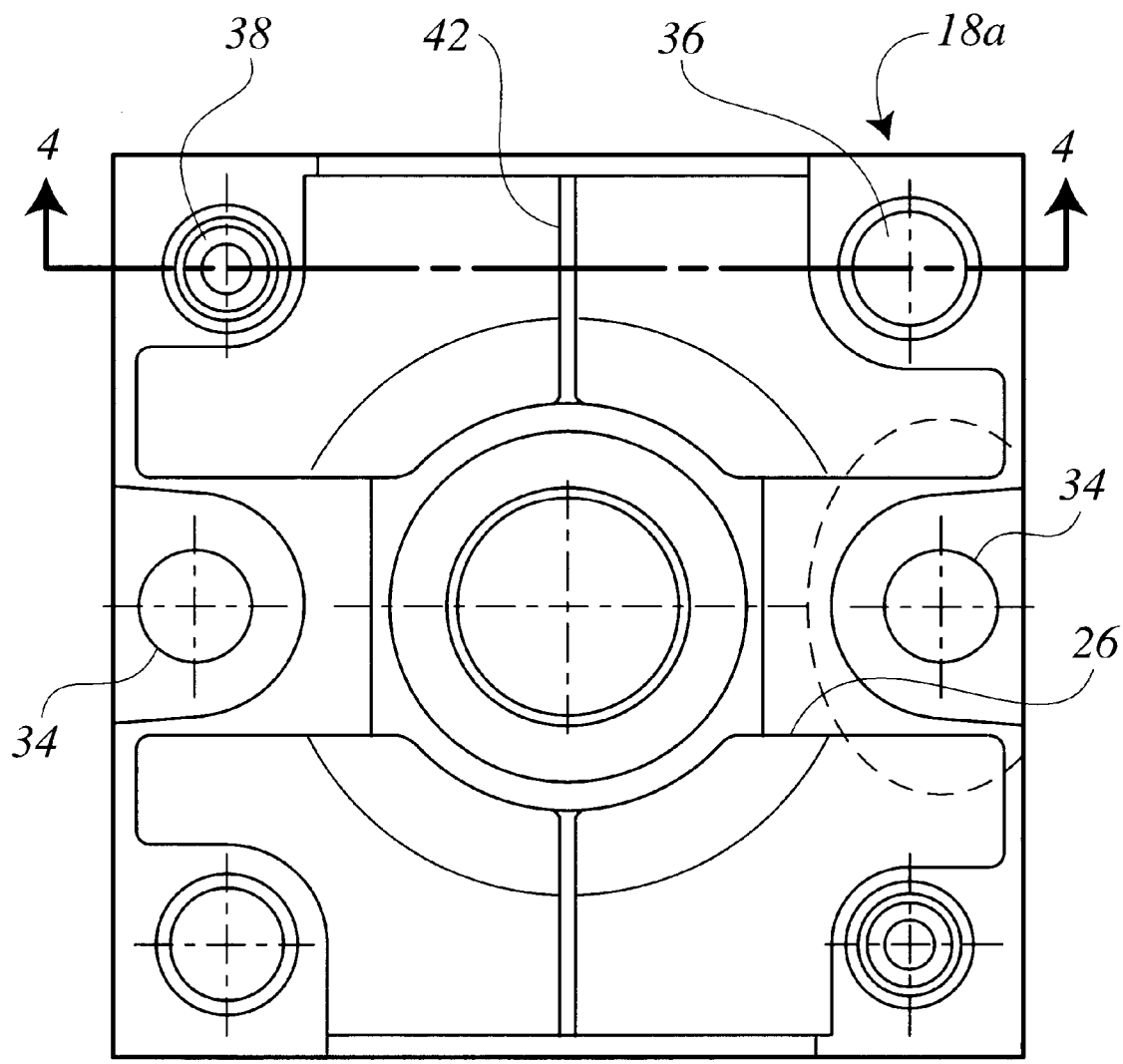
FIG. 3 is a right side view of the valve body.
Figure 4:
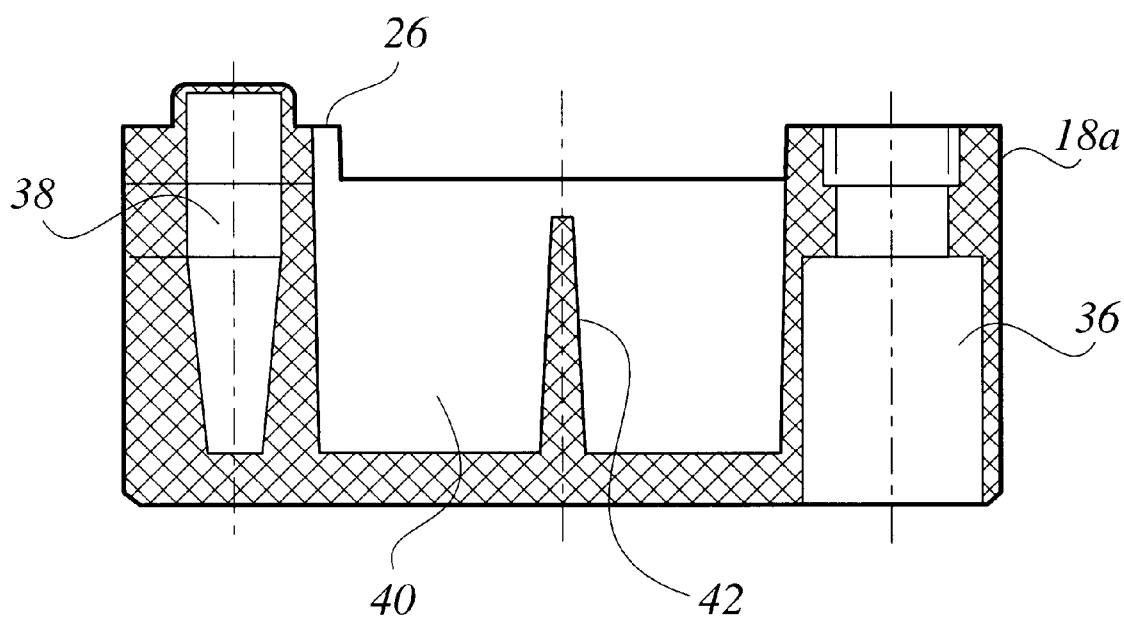
FIG. 4 is a cross-section of the valve body taken across line 4—4 of FIG. 3.

One of the two identical valve bodies 18 is shown in FIGS. 3 through 6. FIG. 3 clearly shows valve port 20 and mounting holes 34. Bolt holes 36 engage with reciprocal threaded holes 38 on opposite valve body sections 18. The o-ring 12 is positioned at valve body port 20 to seal against the moveable slide.

Figure 5:
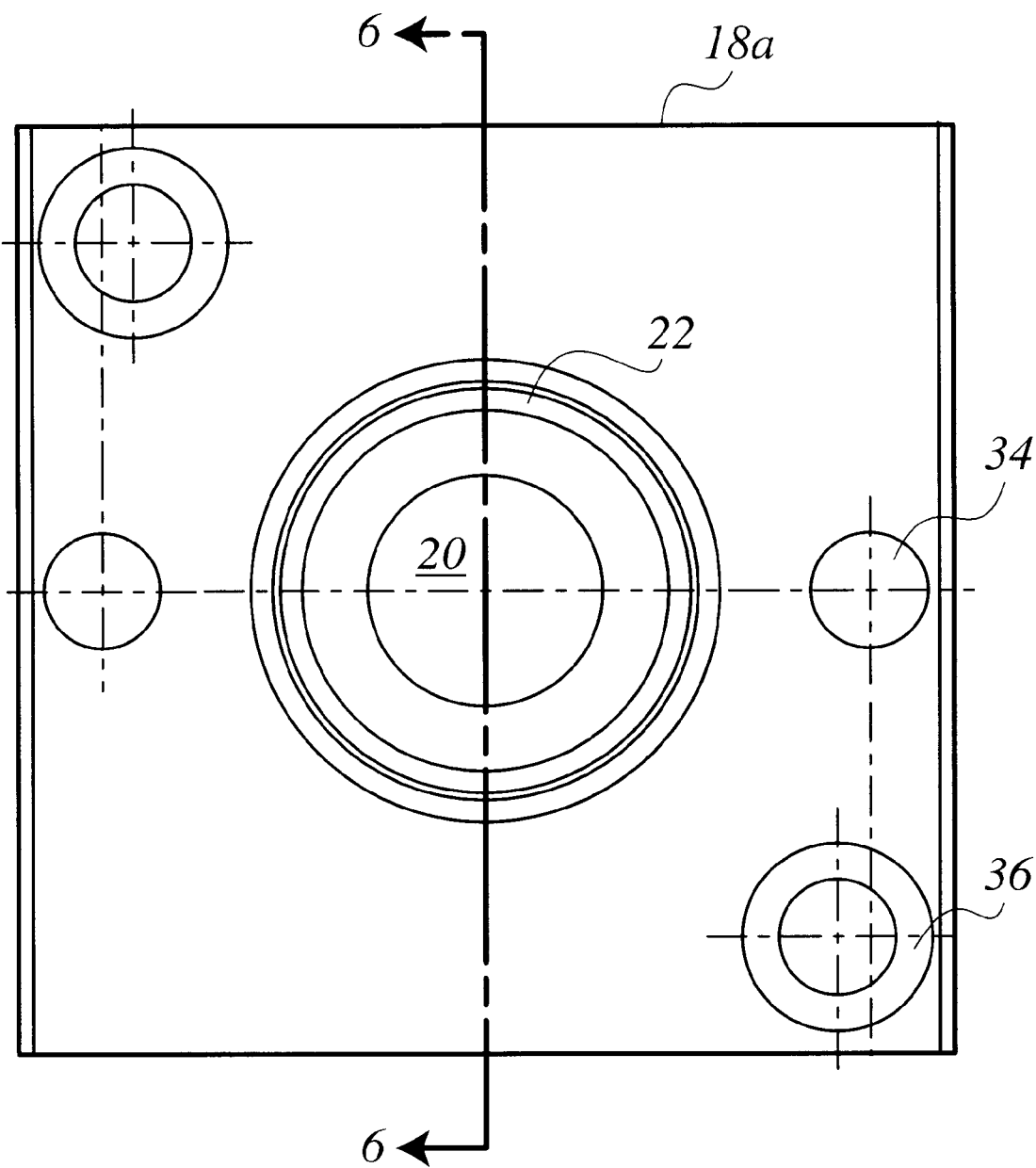
FIG. 5 is a left side elevation of the valve body.
Figure 6:
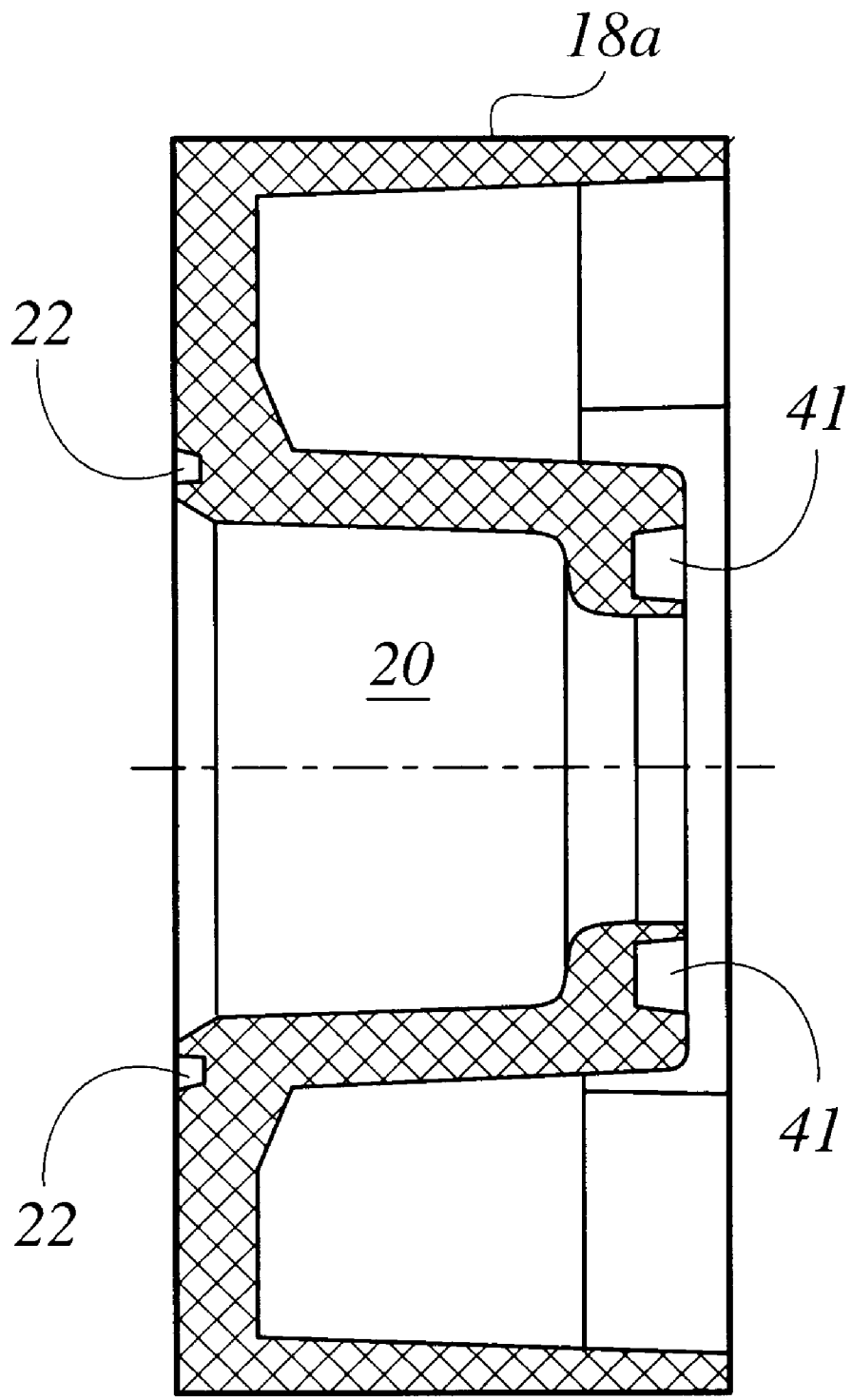
FIG. 6 is a cross-section of the valve body taken across line 6—6 of FIG. 5.

The external view in FIG. 5 shows the through mounting holes for mounting the valve to other modular components as well as the bolt holes 36 used for bolting valve body 18a into valve body 18b which will have reciprocal threaded holes 38. The reciprocal threaded bolt holes 38 are more clearly shown in FIG. 4. O-ring seat 41 can also be clearly seen in FIG. 6 and it is for one of the two o-rings 12 that bracket the slide 10. Flanges 26 that engage shoulders 24 on the slide to limit its movements can be most clearly seen in FIG. 4. The valve bodies have a large hollowed out area 40 to provide for a light part weight. A structural fin 42 is provided for improved manufacturability and as a strengthening element to the valve body.

The slide valve detailed above provides for smooth valve operation at high and low pressures. A long device life is provided by a combination of features but most specifically the support web 14 positioned inside the slide port 11. While the invention has been particularly described with reference to the preferred embodiment thereof it will be understood by those skilled in the art that various modification and changes can be made while still utilizing the principals of this invention.

I claim:

1. A slide valve for controlling a fluid flow, comprising:

a valve body enclosing a slide valve element, said slide valve element comprising
   a valve port having a generally triangular web support within said valve port; and
   seal rings positioned in seats in said valve body engaging said slide valve and at least partially supported by said web support to prevent fluid leakage when said slide valve is in an open or a closed position.

2. The slide valve of claim 1 wherein said support web comprises a broad section and a narrow section, wherein said broad section is positioned such that it is the first section exposed to fluid flow upon opening of said slide valve and such that said broad section helps position said seal rings in their seats upon closing of said slide valve.

3. The slide valve of claim 2 further comprising a locking mechanism for preventing inadvertent opening of the slide valve.

4. The slide valve of claim 2 wherein said valve port in said slide valve is divided into two open sections.

5. The slide valve of claim 1 wherein said slide valve comprises two valve body portions for interlocking assembly to bracket said valve slide.

6. The slide valve of claim 5 wherein said valve body portions further comprise seal seats for sealing said valve body portions against modular components.

7. A slide valve for controlling fluid flow, comprising:

two valve body sections bracketing a valve slide, wherein said valve slide comprises a valve port divided into two sections by a generally triangular support web for at least partially supporting o-ring seals positioned in annular seats in said valve body sections.

8. The slide valve of claim 7 wherein said support web supports o-rings positioned in said valve body sections in a manner which urges said o-rings into their annular seats when said valve slide is moved to control fluid flow through said slide valve.

9. The slide valve of claim 8 wherein said valve slide further comprises a locking mechanism.

10. The slide valve of claim 8 wherein such slide valve further comprising a locking mechanism for scissor locks.

11. The slide valve of claim 8 wherein said slide comprises plastic material and said valve body sections are made of metallic material.

12. The slide valve of claim 8 wherein said slide further comprises indicia of preferred flow direction.

13. The slide valve of claim 12 wherein said slide further comprises ports for venting fluid pressure when said slide valve is closed.

14. A slide valve for controlling a fluid flow comprising:

a valve body enclosing a slide valve element, said slide valve element comprising a valve port having a web support within said valve port, and
   seal rings positioned in seats in said valve body engaging said slide valve to prevent fluid leakage when said slide valve is an open or a closed position, and wherein said support web comprises a broad section and a narrow section, said broad section positioned such that it helps position said seal rings in their seats upon closing of said slide valve.

* * * * *